US008639194B2

(12) United States Patent
Asrani et al.

(10) Patent No.: US 8,639,194 B2
(45) Date of Patent: Jan. 28, 2014

(54) TUNABLE ANTENNA WITH A CONDUCTIVE, PHYSICAL COMPONENT CO-LOCATED WITH THE ANTENNA

(75) Inventors: Vijay L. Asrani, Round Lake, IL (US); Adrian Napoles, Lake Villa, IL (US)

(73) Assignee: Motorola Mobility LLC, Libertyville, IL (US)

( * ) Notice: Subject to any disclaimer, the term of this patent is extended or adjusted under 35 U.S.C. 154(b) by 243 days.

(21) Appl. No.: 13/246,883

(22) Filed: Sep. 28, 2011

(65) Prior Publication Data

US 2013/0078932 A1 Mar. 28, 2013

(51) Int. Cl.
*H04B 1/40* (2006.01)

(52) U.S. Cl.
USPC ......... 455/77; 455/575.7; 455/552.1; 455/73; 455/126; 455/127.4; 343/700 MS; 343/702; 343/713; 333/25; 333/103

(58) Field of Classification Search
USPC ........ 455/77, 575.7, 93.1, 552.1, 73, 74, 126, 455/127.4; 343/700 MS, 702, 713, 753, 343/749, 846; 333/25, 103
See application file for complete search history.

(56) References Cited

U.S. PATENT DOCUMENTS 6,064,868 A * 5/2000 Kobayashi ................. 455/193.1
6,657,595 B1 * 12/2003 Alameh et al. ................ 343/702
6,765,536 B2 7/2004 Phillips et al.
6,861,989 B2 * 3/2005 Morningstar et al. ........ 343/702
6,914,570 B2 * 7/2005 Asrani et al. .................. 343/702
7,084,831 B2 * 8/2006 Takagi et al. ................. 343/860
7,167,135 B2 * 1/2007 Kipnis et al. .................. 343/749
7,180,453 B2 * 2/2007 Nakagawa et al. ........... 343/702
7,199,761 B2 * 4/2007 Martinez et al. .............. 343/702
7,212,801 B2 * 5/2007 Leete ............................ 455/307
7,447,530 B2 * 11/2008 Iwai et al. .................. 455/575.7
7,477,196 B2 * 1/2009 Asrani et al. ........... 343/700 MS
7,589,673 B2 * 9/2009 Kuramoto ............. 343/700 MS
7,675,469 B2 3/2010 Ohba et al.
7,764,237 B2 * 7/2010 Black et al. ................... 343/702
7,764,932 B2 * 7/2010 Rofougaran et al. ........... 455/77
7,843,327 B1 * 11/2010 DiMartino et al. ...... 340/539.11
7,949,309 B2 * 5/2011 Rofougaran et al. ........... 455/77

(Continued)

FOREIGN PATENT DOCUMENTS

WO 2009115996 A1 9/2009

OTHER PUBLICATIONS

Silicon Labs: Broadcast FM Radio Receiver for Consumer Electronics, Si4704/05-D50, Copyright 2010 by Silicon Laboratories, Confidential Rev. 1.0 Dec. 2010, all pages.

*Primary Examiner* — Marceau Milord

(57) ABSTRACT

A method and device for providing impedance tuning to compensate for capacitive loading effects on an antenna which are associated with conductive or physical components in close proximity to the antenna is provided. A dynamic impedance tuning (DIT) controller periodically receives information that indicates that one or more functions of a physical component and/or a particular device operating state are currently active. In response to one or more functions of the physical component being activated, the DIT controller configures the tunable impedance to a pre-set impedance level to compensate for capacitive loading effects on the antenna. In addition, the controller triggers a switch to connect the tunable impedance to the ground signal line to provide antenna tuning corresponding to the preset impedance level. The tunable impedance adjusts the terminal impedance of the ground signal line to minimize capacitive loading effects associated with the signal line.

20 Claims, 11 Drawing Sheets

(56) References Cited

U.S. PATENT DOCUMENTS

| | | | | |
|---|---|---|---|---|
| 8,073,514 | B2 * | 12/2011 | Black et al. | 455/575.7 |
| 8,144,061 | B2 * | 3/2012 | Sakuma | 343/700 MS |
| 8,228,236 | B2 * | 7/2012 | Birnbaum et al. | 343/700 MS |
| 8,259,026 | B2 * | 9/2012 | Pulimi et al. | 343/846 |
| 8,264,412 | B2 * | 9/2012 | Ayala et al. | 343/702 |
| 8,451,941 | B2 * | 5/2013 | Zhu et al. | 375/296 |
| 8,472,908 | B2 * | 6/2013 | Anguera et al. | 455/272 |
| 2007/0200766 | A1 * | 8/2007 | McKinzie et al. | 343/700 MS |
| 2007/0232367 | A1 * | 10/2007 | Kasha et al. | 455/574 |
| 2011/0014886 | A1 * | 1/2011 | Manssen et al. | 455/121 |

* cited by examiner

500

600

700

800

TUNABLE ANTENNA WITH A CONDUCTIVE, PHYSICAL COMPONENT CO-LOCATED WITH THE ANTENNA

BACKGROUND

1. Technical Field

The present invention relates in general to wireless communications devices and in particular to antenna tuning in wireless communications devices.

2. Description of the Related Art

There are an increasing number of mode combinations, features and functions, and applications, including multimedia and gaming applications available in newer models of wireless communications devices, while the physical size of the devices continues to decrease. In addition, many conventional wireless communications devices can support other electronic functionality, including the use of auxiliary audio components, such as a headset, that interfaces with the device. While the various applications and electronic functions are being used, ensuring that audio and antenna performance are not negatively impacted presents a unique challenge. The communication challenges further increase as a result of the wide range of transmission requirements associated with the various communication modes that the device is expected to support.

Traditional approaches to this challenge involve the use of multiple antennas with spatial-time signal processing. However, as handset designers continue to shrink their products for the user's convenience, the space available for radiating structures is becoming increasingly limited. Limited space and limited sizes of radiating elements causes communications devices to be more susceptible to capacitive loading effects associated with other conductive and/or movable elements that are co-located with the antenna and/or in close proximity to the antenna.

BRIEF DESCRIPTION OF THE DRAWINGS

The described embodiments are to be read in conjunction with the accompanying drawings, wherein.

DETAILED DESCRIPTION

Figure 1:
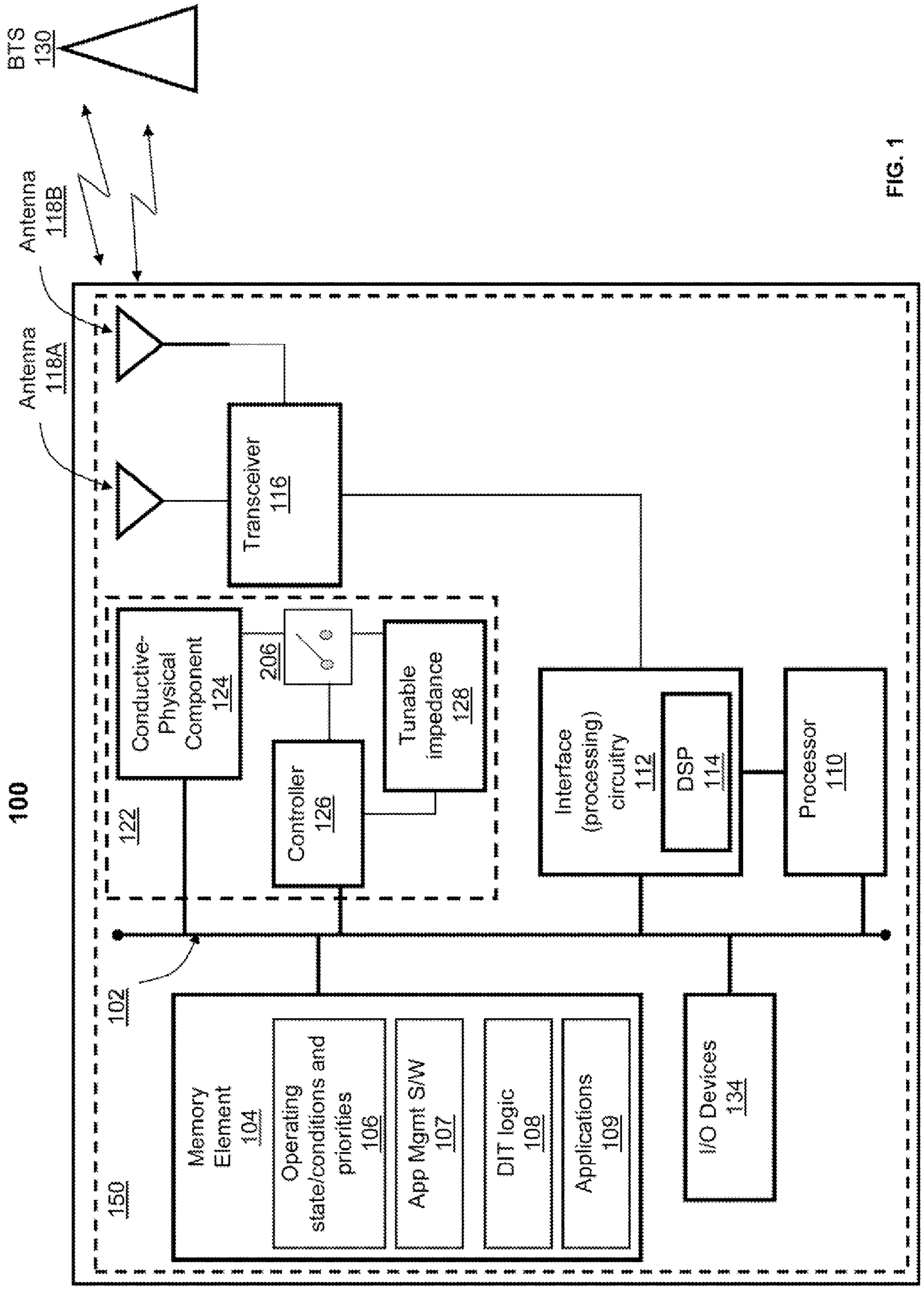
FIG. 1 illustrates an example block diagram representation of a wireless communications device, within which features of the described embodiments can be incorporated, according to one embodiment.

The illustrative embodiments provide a method, tunable impedance integrated circuit (IC), and communications device for providing impedance tuning to compensate for capacitive loading effects on an antenna, where the capacitive loading is associated with conductive or physical components in close proximity to the antenna. A dynamic impedance tuning (DIT) controller and/or DIT logic executing on a processor periodically receives information that indicates that at least one function of a physical component and/or a particular device operating state is currently active on the wireless communications device. In response to the at least one function of the physical component being activated, the DIT controller configures the tunable impedance to a pre-set impedance level to compensate for capacitive loading effects on the antenna. In addition, the controller triggers a switch to connect the tunable impedance to the ground signal line of the physical component to provide antenna tuning corresponding to the preset impedance level. The tunable impedance adjusts the terminal impedance of the ground signal line to minimize capacitive loading effects associated with the ground signal line.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the described embodiments. The embodiments may thus be described with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the claimed embodiments to embodiments in which different element, feature or concept names are utilized. Thus, each term utilized herein is to be given its broadest interpretation given the context in which that terms is utilized.

As further described below, implementation of the functional features of the invention described herein is provided within processing devices/structures and can involve use of a combination of hardware, firmware, as well as several software-level constructs (e.g., program code) that execute to provide a specific utility for the device. The presented figures illustrate both hardware components and software/logic components within example wireless communications device architecture.

With specific reference now to FIG. 1, there is depicted a block diagram of an example dual antenna wireless communications device 100, within which certain of the functional aspects of the described embodiments may advantageously be implemented. For simplicity, wireless communications device 100 shall be referred to herein simply by the acronym WCD 100. In one embodiment, the wireless communications device is a mobile device, such as a cellular phone, smartphone or laptop, netbook or tablet computer or similar device. As such, WCD 100 can be any type of communication device, such as a two-way radio communication device that experiences and detects different operating conditions, including the presence of a capacitive load proximate to the antenna, and responds to the different operating conditions by providing a respective level of impedance tuning WCD 100 comprises processor 110 and communication interface circuitry 112, which comprises digital signal processor (DSP) 114. Processor 110 and interface circuitry 112 are connected to memory element 104 via signal bus 102. WCD 100 includes a radio frequency (RF) transceiver integrated circuit (IC) 116 that enables WCD 100 to send and receive communication signals. In at least one embodiment, the sending and receiving functions of the transceiver occurs wirelessly, and the wireless communication is facilitated by one or more antennas, e.g., antenna 118A and antenna 118B, to propagate signals from transceiver IC 116. The number of antennas can vary from device to device, ranging from a single antenna to two or more antennas, and the presentation within WCD 100 of two antennas is merely for illustration. Additionally, the positioning of the two antennas can be at different locations within casing 150 of WCD 100 to account for different operating conditions that can affect one antenna's ability to effectively propagate signals relative to the other antenna. WCD 100 is able to wirelessly communicate with an external communication device, such as base transceiver system (BTS) 130, or simply base-station, via antenna 118A/118B.

WCD 100 also comprises various other components that provide specialized functions. For example, WCD 100 comprises physical component 124 and dynamic impedance tuning (DIT) controller 126, which are both connected to signal bus 102. DIT controller 126 enables physical component 124 to be connected to tunable impedance 128 and/or to ground, in response to an activation of one or more functions of physical component 124. Tunable impedance 128 is utilized by controller 126 to perform impedance matching and is utilized for antenna tuning to minimize capacitive loading effects on an antenna (e.g., antenna 118A) that is co-located with physical component 124. Collectively, controller 126, tunable impedance 128, and physical component 124 or specific circuit components of physical component 124 represent impedance tuning circuit components (ITCC) 122. An antenna is described as being co-located with a physical, conductive component and/or sub-components of the physical, conductive component if the physical, conductive component and/or sub-components of the physical, conductive component are located within the antenna volume. The antenna volume includes or surrounds a corresponding antenna and is an established region or space, in which, other co-located conducting elements can cause interference with the antenna performance. In one embodiment, the capacitive loading effects are caused by one or more functions of physical component 124 being activated. DIT controller 126 provides specific functionality that is described in greater detail below. In one embodiment, ITCC 122 includes a switch 206 that controller 126 uses to enable particular circuit elements of tunable impedance 128 to be switchably and/or selectively connected to a configurable or an adjustable terminal impedance, e.g., tunable impedance 128.

In one implementation, physical component 124 is a headset jack circuit component operates as an I/O device that receives audio input from a user and provides audio output to the user. Other examples of physical component 124 include a micro-USB (Universal Serial Bus) connector and a High Definition Multimedia Interface (HDMI) connector. A further example of physical component 124 is a speaker, such as a polyphonic speaker, that includes at least one of a movable element and a metallic or conductive element that exhibits movement and vibration while the speaker is being used in a particular operating state of the communications device. WCD 100 comprises one or more input/output (I/O) devices 134, which can be utilized based on current device operating conditions and which can, in certain scenarios, contribute to establishing the current device operation conditions. In at least one embodiment, the I/O devices 134 comprise audio components, including one or more of a speaker and/or a headset jack. In one embodiment, physical component 124 is one of I/O devices 134 and the impedance tuning features described herein can be implemented in response to use of the particular one of I/O devices 134.

In addition to the above described hardware components of WCD 100, various features of the described embodiments can be completed and/or supported via software or firmware code or programmable logic stored within a controller, e.g., controller 126, memory 104, or other storage (not shown) and executed by one of DSP 114 and Processor 110. Thus, for example, illustrated within memory 104 are a number of software, firmware, and/or logic components or modules, including operating state and priorities data module 106, application management software 107, and one or more applications, applications 109. When executed, one or more of the applications can each contribute to the determining or triggering of a particular device operating condition. In one embodiment, WCD 100 utilizes application management software 107 and other information collected by DIT controller 126 to determine the operating conditions of the WCD 100.

As illustrated, memory 104 also comprises dynamic impedance tuning (DIT) logic 108. In the descriptions which follow, DIT logic 108 represents additional software, firmware, and/or logic components, which execute on processor 110 and/or controller 126 to provide specific functions, as described below. In the described embodiment, DIT logic 108 provides certain executable code that triggers controller 126 to perform certain antenna tuning functions. Additional detail of the functionality associated with DIT logic 108 is presented below with reference to FIG. 2 and subsequent figures.

Certain of the functions supported and/or provided by DIT logic 108 can be implemented via processing logic or code executed by a wireless device processor and/or other device hardware, such as controller 126. Among the software implemented logic functions provided by DIT logic 108, in the described embodiments, are: (a) logic for receiving information of active operating states in a communications device; (b) logic for receiving notification about the presence of a headset; (c) logic for determining whether at least one function of a physical, conductive component is activated; (d) logic for configuring the pre-established level of impedance within a tunable impedance to provide antenna tuning to compensate for capacitive loading caused by at least one function of the physical component being activated; and (e) logic for triggering a switch to connect a tunable impedance to the ground signal line of the physical component to provide antenna tuning corresponding to the configured level of impedance. In one embodiment, the DIT logic further provides: (f) logic for determining which one of a current set of active operating states is a highest priority operating state; and (g) logic for selectively connecting the tunable impedance to a signal line of a particular physical component associated with the highest priority operating state.

Figure 2:
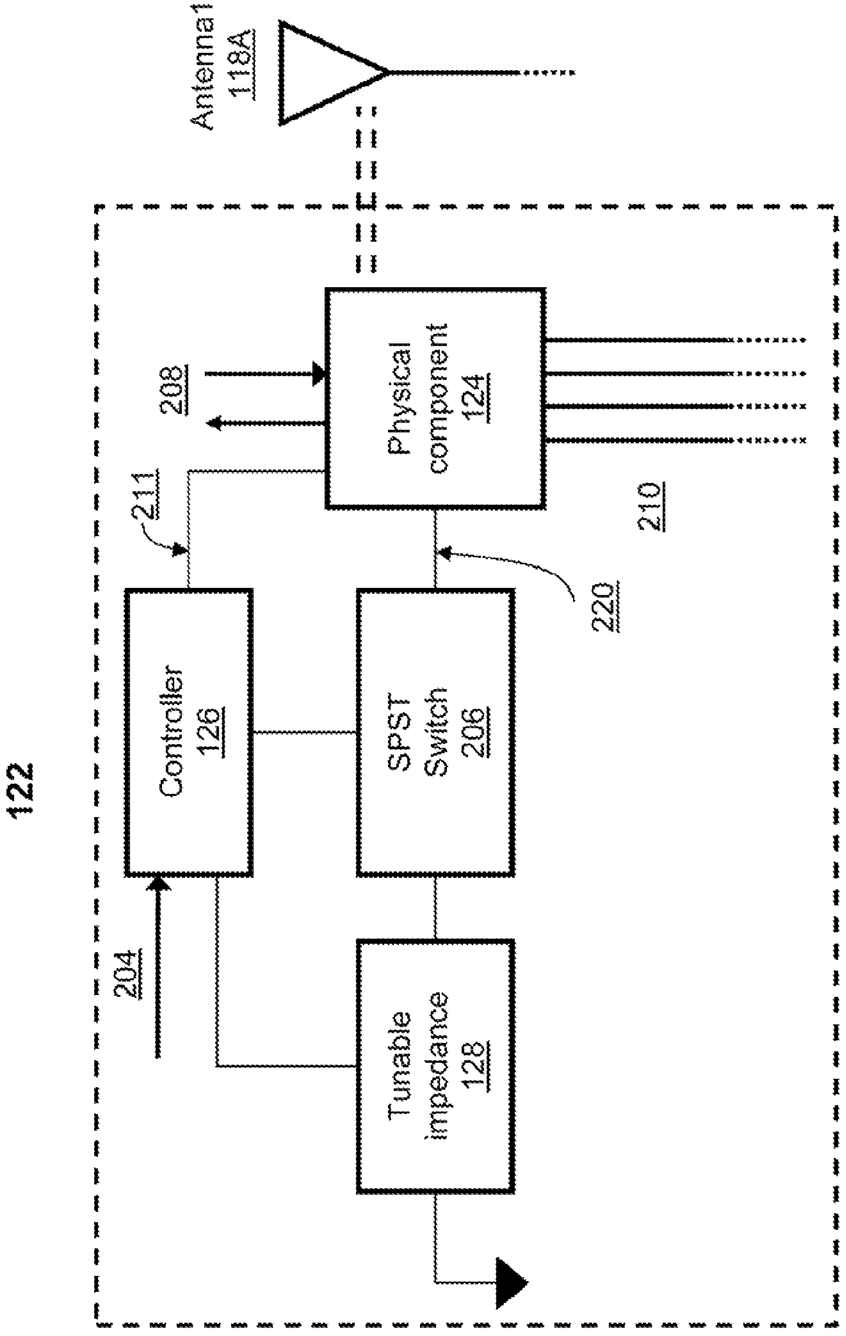
FIG. 2 illustrates a block diagram representation of impedance tuning circuit components (ITCC), in a wireless communications device (WCD), according to one embodiment.

With reference now to FIG. 2, there is presented a block diagram representation of impedance tuning circuit components (ITCC) 122 in a wireless communications device (WCD), such as WCD 100 of FIG. 1, according to one embodiment. ITCC 122 includes physical component 124. In one embodiment, physical component 124 is connected to DIT controller 126. In addition, DIT controller 126 is coupled to switch 206. Switch 206 is coupled to physical component 124 via a first port and to tunable impedance 128 via a second port. In response to activation of one or more functions of physical component 124, DIT controller 126 selectively triggers switch 206 to connect the first port to the second port in order to connect physical component 124 to tunable impedance 128. Tunable impedance 128 is connected to common ground. Tunable impedance 128 performs impedance matching and/or antenna tuning to minimize capacitive loading effects on an antenna (e.g., antenna 118A) that is co-located with physical component 124. The capacitive loading effects are caused by one or more functions of physical component 124 being activated.

Controller 126 receives information about the device's operating state via input 204. In one embodiment, the device's operating state is associated with the number of running applications and the types of applications that are being executed within WCD 100. Application management software 107 is configured to periodically report this information to controller via input 204, either independently or in response to a query received from controller 126. The information provided to controller 126 via input 204 identifies the executing applications and provides other information related to the execution of these applications. Additionally, the information received by controller 126 indicates when particular functions are being activated. In one embodiment, physical component 124 provides controller 126 with information that indicates when the particular functions are being activated. In one embodiment, physical component 124 receives one or more inputs and transmits one or more outputs (e.g., inputs/outputs 208) which may indicate activation of particular functions of physical component 124. For example, in one embodiment, physical component 124 is a headset jack that is configured to support communication of audio signals by connecting a headset to the headset jack 124. In one embodiment, controller 126 is connected via connection 211 to the "detect" signal line of headset jack 124 to receive automatic notification of a headset's presence (i.e., a headset plug is inserted into headset jack component 124). In response to detecting that a plug is inserted into headset jack component (124), controller 126 transmits configuration data (e.g., tuning state data) to tunable impedance 128 to configure a pre-established level of impedance corresponding to an operating state in which the headset is present. In response to tunable impedance 128 being configured with the pre-established level of impedance, controller 126 triggers switch 206 to connect tunable impedance 128 to the ground signal line of headset jack 124.

In another implementation, controller 126 receives via input 204 information about the initiation of a particular operating state that triggers or is associated with a capacitive loading impact that causes a shift or change in the operating frequency. Controller 126 configures tunable impedance 128 and triggers switch 206 to connect tunable impedance 128 to the ground signal line of headset jack 124. The connection of tunable impedance 128 to the ground signal line provides antenna tuning that compensates for the capacitive loading impact that can cause the shift or change in operating frequency of the device.

In one embodiment, in which physical component 124 is headset jack or similar receiving port, physical component 124 comprises one or more signal lines connected to printed circuit board (PCB) contacts that are extended from a PCB. Further, the one or more signal lines can be isolated with passive devices, such as inductors and capacitors, arranged in series or parallel. In one embodiment, the PCB contacts are implemented by using spring elements. These spring elements are movable elements and/or are metallic or conductive elements that exhibit movement and vibration while the physical component is being used. The spring elements can exhibit such movement and vibration while the communications device is in a particular operating state. The controller 126 configures the tunable impedance to an impedance level to minimize capacitive loading associated with the movement and vibration of at least one conductive spring element. The capacitive loading impacts an antenna that is co-located with physical component 124, which, in one embodiment, comprises the PCB contacts and/or corresponding spring elements associated with respective signal lines.

In one embodiment, physical component 124 comprises signal lines, which, in one embodiment, includes an independent or isolated ground signal line. In a particular implementation, tunable impedance 128 is switchably connected via a switch to the independent ground signal line. Tunable impedance 128 provides impedance tuning for the first antenna to minimize capacitive loading experienced by or impacted upon the first antenna while one or more functions of physical component 124 are activated. In one embodiment, activation of these functions represents a specific operating state and/or correlate to the device being in a particular operating state.

In the example of the headset jack component having several signal lines, the independent ground line is an audio ground line. Capacitive loading effects on the antenna may be caused by at least one of the signal lines of the headset jack component. In particular, capacitive loading effects may emanate from at least one of the contact spring elements corresponding to and/or coupled to the at least one of the signal lines. The capacitive loading effects may be induced by movement and/or vibration of at least one of the conductive, spring elements corresponding to the at least one of the signal lines. This movement and/or vibration may be either triggered or intensified by the use and presence of a headset (i.e., the device is in an operating state in which the headset is plugged into the headset jack). In one embodiment, tunable impedance 128 is switchably connected via a switch to the independent, audio ground signal line to adjust the terminal impedance of the audio ground signal line. A specific level of adjustment of the terminal impedance that is provided by connecting tunable impedance 128 to the independent, audio ground signal line minimizes the capacitive loading effects emanating from the at least one of the signal lines. In another embodiment, tunable impedance 128 is switchably connected to a different signal line instead of being connected to the audio ground signal line. In yet another embodiment, tunable impedance 128 is switchably connected to the signal line associated with capacitive loading that most negatively impacts the proximate antenna. However, as provided herein, tunable impedance 128 is more generally described as being switchably connected to physical component 124 to minimize capacitive loading effects that (a) are induced or caused by the physical component and (b) impacts the proximate antenna. This more general description that is provided herein is simply used to facilitate an explanation of the features and functionality of the illustrative embodiments.

Physical component 124 is presented generally to describe any component that comprises (a) at least one conductive and/or movable element from which capacitive loading effects on a proximate antenna can originate; wherein the at least one conductive and/or movable element is respectively associated with and/or coupled to at least one signal line; and (b) a connection between the at least one signal line or a corresponding ground signal line of the physical component and a switch; wherein the switch is connected to a tunable impedance. To minimize the capacitive loading effects on an antenna, which are caused by the at least one conductive and/or movable element being in close proximity to the antenna.

When the one or more functions of the physical component are activated, controller 126 configures the tunable impedance 128 to a pre-set impedance level to compensate for the capacitive loading impact caused by the activation of the specific function, and controller 126 triggers the switch to connect the tunable impedance 128 to the ground signal line to provide antenna tuning corresponding to the preset impedance level. The terminal impedance "Z", which is the configured preset impedance level that is provided by tunable impedance 128, is configured to provide the desired antenna tuning. As a result, physical component 124 and antenna 118A are co-located without causing substantial negative impact on (a) the functional performance associated with the physical component, such as the audio performance associated with the headset jack, and/or (b) antenna performance.

Referring again to FIG. 2, tunable impedance 128 additionally provides impedance tuning to provide operating frequency switching or adjustments. Controller 126 detects whether an operating frequency of the communications device is being adjusted from a first operating frequency to a second, adjusted operating frequency. In response to detecting that the operating frequency is being adjusted, controller 126 configures the tunable impedance to a next pre-set impedance level that supports the adjusted operating frequency, and controller 126 triggers the switch to connect the tunable impedance to a signal line (e.g., ground signal line 220) of the physical component to tune antenna 118A to operate at a particular operating frequency corresponding to the adjusted operating frequency.

In one embodiment, the operating frequency is adjusted to enable the device to switch from a transmit operating state to a receive operating state. In particular, controller 126 configures tunable impedance 128 to a pre-determined impedance level to enable the communications device to switch an antenna operating frequency from a first operating frequency to a second operating frequency. Controller 126 configures tunable impedance 128 to support an operating frequency adjustment in response to detecting that the communications device is switching from operating in the transmit state, associated with a first frequency band, to operating in the receive state, associated with a second frequency band. In one embodiment, controller 126 receives a band select signal to trigger the change in operating frequency. In a related embodiment, the change in operating frequency is triggered by a change in wireless communications standard from third generation (3G) to fourth generation (4G).

In one embodiment, the tunable impedance 128 provides a pre-established level of antenna tuning to compensate for a pre-determined capacitive load. However, in an alternate embodiment, the tunable impedance 128 may also provide a dynamically determined level of antenna tuning to compensate for a variable capacitive load. In this alternate embodiment, the tunable impedance 128 may be dynamically adjusted after being connected to the ground signal line 220. In one embodiment, the tunable impedance may be dynamically adjusted based on received information about detected signal levels at the antenna input.

Figure 3:
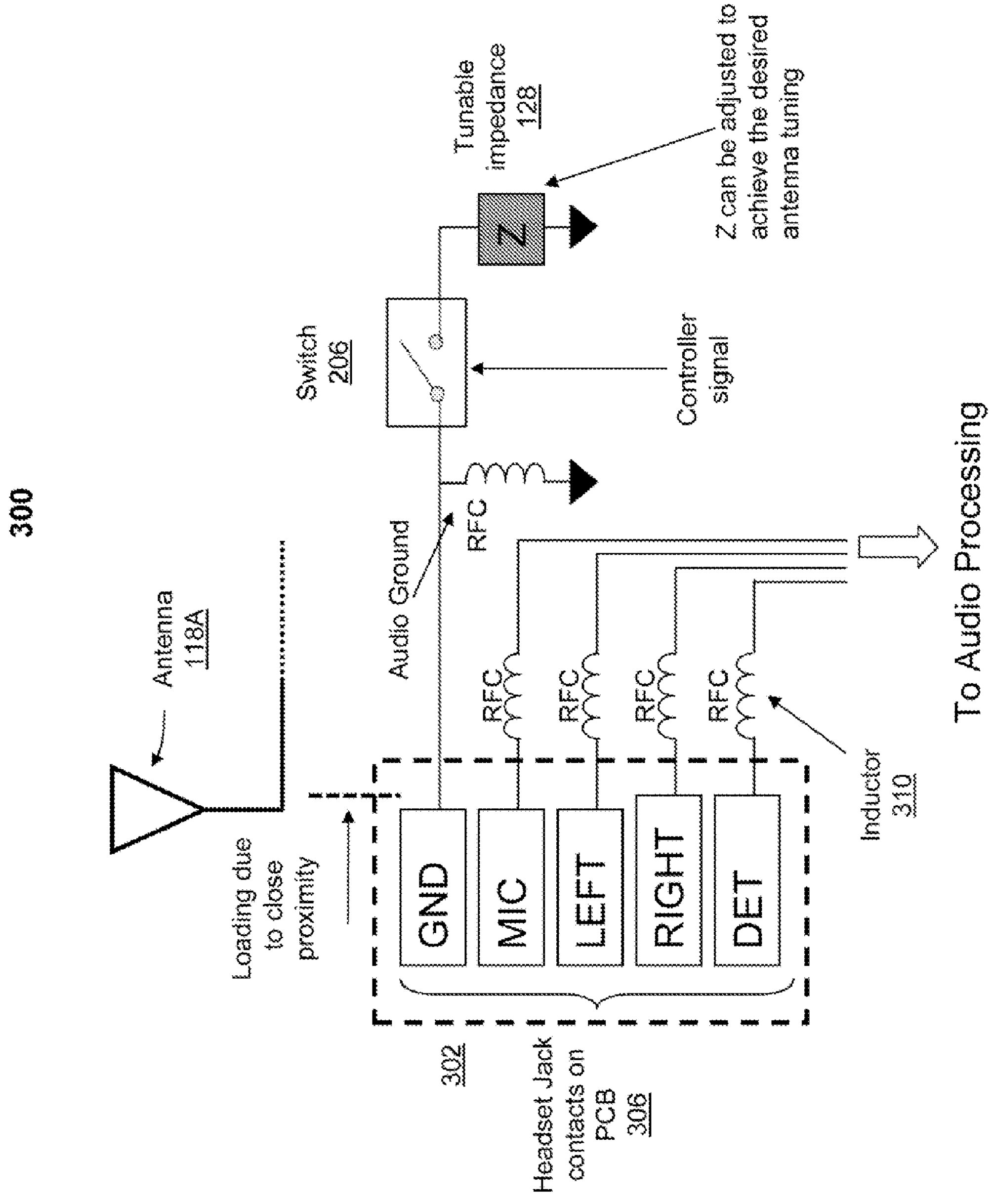
FIG. 3 illustrates an antenna tuning system that utilizes the internal circuit components of a headset jack, wherein the headset jack represents one specific implementation of a physical component, according to one embodiment.

Turning now to FIG. 3, an antenna tuning system that utilizes the internal circuit components of a headset jack, wherein the headset jack represents one specific implementation of a physical component, is illustrated, according to one embodiment. Tuning system 300 comprises headset jack component 302 which further comprises five PCB contacts 306 corresponding to each of the following five (5) signal lines: the microphone (MIC) signal line, the ground (GND) signal line, and Left, Right, and Detect (DET) signal lines. In one embodiment, the five PCB contacts 306 of headset jack component 302 are implemented by using five (5) metallic and movable spring elements (e.g., PCB spring contacts 306). The five PCB spring contacts 306 for respective signal lines are connected in series with inductors, for example, inductor 310. As illustrated within tuning system 300, the inductors connected to PCB spring contacts 306 are implemented using radio frequency chokes (RFCs). In the illustrative embodiment, the RFCs are placed on the PCB and are external to headset jack component 302. These RFCs prevents the flow of alternating current (AC) or high frequency signals on the respective lines and/or isolates alternating currents from surrounding circuitry including signal or audio processing circuitry. In one embodiment, one or more PCB contacts for respective signal lines of the physical components are connected to other passive devices and in various circuit configurations. For example, one or more PCB contacts may be connected in parallel to inductors and Capacitors (LC), and/or filter circuits to isolate the signal lines from the surrounding circuitry.

Headset jack component 302 has five (5) signal lines, including an audio ground line which is an independent ground line. Capacitive loading effects on the antenna may be caused by at least one of the signal lines of the headset jack component. In particular, capacitive loading effects may emanate from at least one of the contact spring elements coupled to the at least one of the signal lines. The capacitive loading effects may be induced by movement and/or vibration of at least one of the conductive, spring elements corresponding to the at least one of the signal lines. This movement and/or vibration may be either triggered or intensified by the use and presence of a headset (i.e., the device is in an operating state in which the headset is plugged into the headset jack). Antenna tuning system 300 also comprises switch 206 which is connected to tunable impedance 128. Tunable impedance 128 is coupled to common ground. In one embodiment, tunable impedance 128 is switchably connected via switch 206 to the independent, audio ground signal line to adjust the terminal impedance of the audio ground signal line. In another embodiment, tunable impedance 128 is switchably connected to a different signal line instead of being connected to the audio ground signal line. In yet another embodiment, tunable impedance 128 is switchably connected to the signal line associated with capacitive loading that most negatively impacts the proximate antenna (e.g., antenna 118A). In yet another implementation, a variable tuner is used to provide a tunable impedance and a switch is not utilized. In this implementation, the ground signal line is directly connected to the variable tuner or to a variable tuner circuitry through (a) series inductors or (b) passive circuits, which, for example, may include at least one filter.

The proximity of the PCB spring contacts 306 to the antenna provides a capacitive load on the antenna which causes a change in the antenna impedance. To compensate for the potential and/or expected change in the antenna impedance, controller 126 configures tunable impedance 128 to a pre-determined level of impedance and triggers switch 206 to connect tunable impedance 128 to a signal line of the headset jack. In the illustrative embodiment, when the controller triggers the switch 206 to be in a closed position, switch 206 connects tunable impedance 128 to the ground signal line, which includes a corresponding spring element. Connecting tunable impedance 128 to the ground signal line provides a change in the spring impedance with respect to ground. The tunable impedance adjusts the terminal impedance of the ground signal line to minimize capacitive loading effects associated with at least one of the signal lines. The tunable impedance 128 is able to provide a load adjustment to the antenna and, as a result, shift or tune the antenna response.

Figure 4:
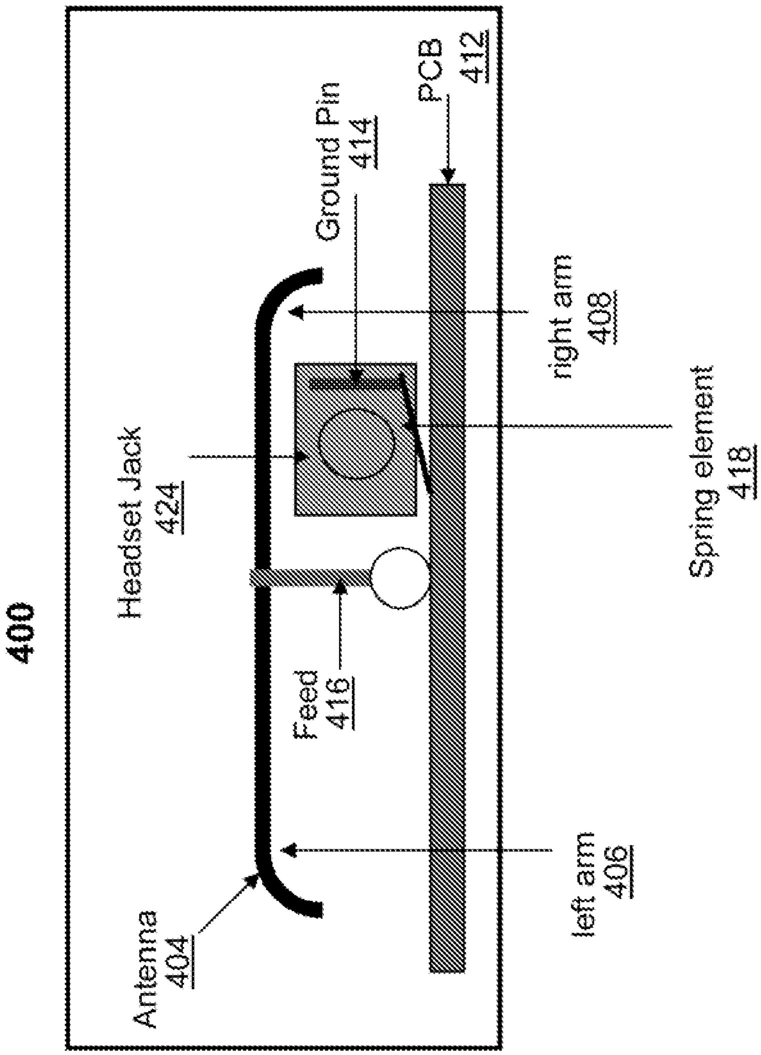
FIG. 4 depicts an example collection of co-located radiating and conductive, physical elements, within an antenna volume, on a printed circuit board (PCB), according to one embodiment.

Referring to FIG. 4, there is presented an example collection of co-located radiating and conductive, physical elements, within an antenna volume, above a printed circuit board (PCB), according to one embodiment. Antenna volume 400 comprises antenna 404 which comprises left arm 406 and right arm 408. Antenna 404 is coupled to antenna feed component 416. In one embodiment, feed component 416 refers to the components connecting the antenna to the transmitter or receiver, such as an impedance matching network, in addition to the transmission line. Antenna volume 400 also comprises headset jack 424, which is positioned adjacent to or below antenna right arm 408. Headset jack 424 comprises ground pin 414 which is secured to PCB 412 by a flexible spring element 418.

With continuing reference to the tuning system of FIG. 3, and control system of FIG. 2, controller 126 configures tunable impedance 128 to a pre-determined level of impedance and triggers switch 206 to connect tunable impedance 128 to ground pin 414 to provide antenna tuning corresponding to the pre-determined level of impedance. The antenna tuning provided compensates for the presence of a headset and, in particular, for capacitive loading impact that results from an operating state in which the headset is present and is being used. The terminal impedance provided by tunable impedance 124 adjusts the impedance of spring element 418 with respect to ground. This adjustment of the spring impedance causes an operating frequency adjustment or an impedance transformation that compensates for capacitive loading effects on antenna 404. These capacitive loading effects are caused by movement and vibration in the conductive and flexible spring element. These capacitive loading effects are primarily the result of the conductive spring elements being co-located with antenna 404 within antenna volume 400. In one embodiment, antenna 404 is designed with multiple arms or branches to resonate at the various cellular bands for corresponding communications modes. The corresponding frequency responses are illustrated in FIG. 5.

Figure 5:
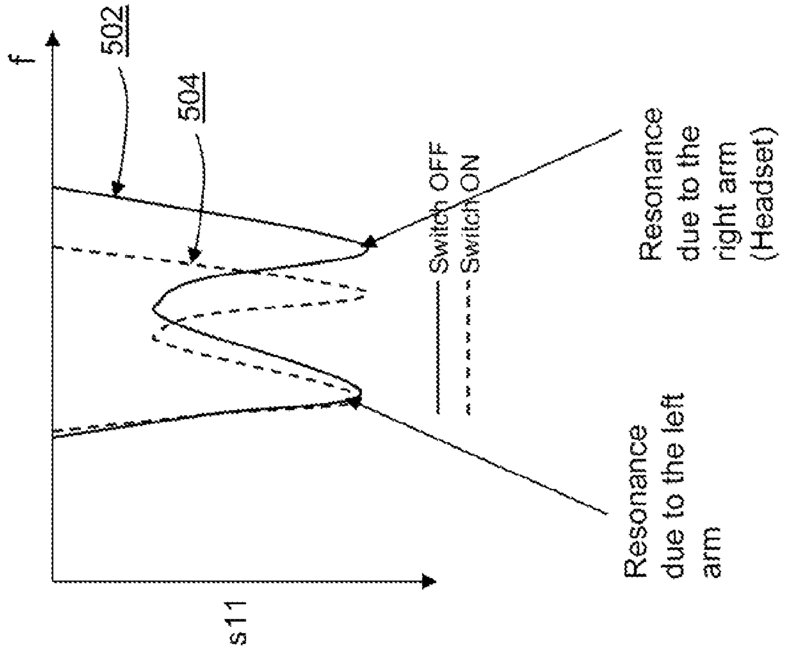
FIG. 5 illustrates frequency response plots for an antenna, according to one embodiment.

FIG. 5 illustrates frequency response plots for signals at the antenna 404 of FIG. 4, according to one embodiment. Graph 500 comprises first plot 502 and second plot 504. First plot 502 shows the antenna frequency response when tunable impedance 128 is not connected to the ground pin or signal line. First plot 502 illustrates that the resonance observed due to the left arm 406 is different to the resonance at the right arm 408 of antenna 404. Furthermore, the resonance observed at the left arm is a shifted frequency response relative to the resonance observed at the right arm of the antenna 404. The resonance at the right arm is affected by the presence of the ground pin and the securing spring elements below the right arm of the antenna. Second plot 504 shows the antenna frequency response when tunable impedance 128 is connected to the signal line. A comparison of second plot 504 and first plot 502 demonstrates that a properly or ideally configured and connected tunable impedance provides a substantial frequency response adjustment or correction for the right antenna arm. However, the impact of the headset presence and or associated ground spring to the left arm is minimal. Thus, only a minimal correction to the frequency response for the left arm is possible or likely.

Figure 6:
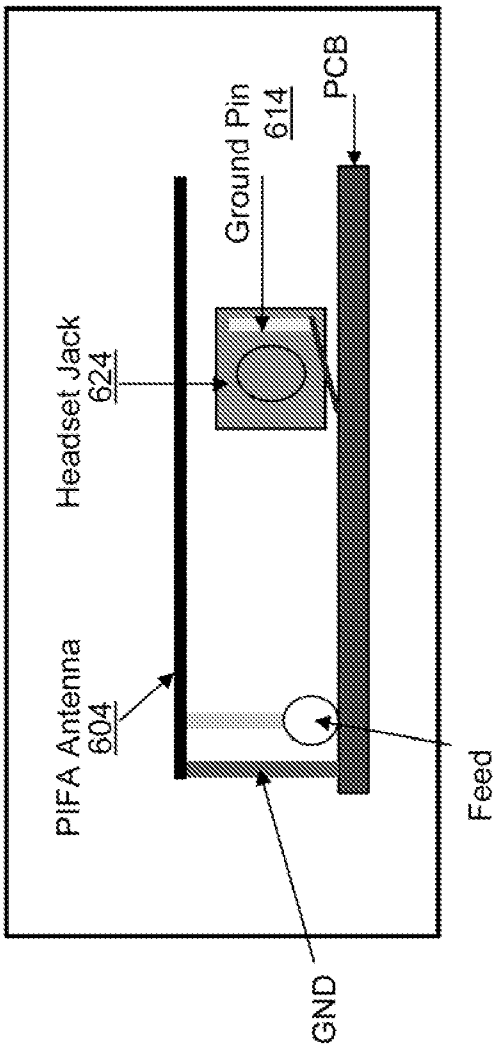
FIG. 6 illustrates another example collection of co-located radiating and conductive, physical elements, within an antenna volume, on a printed circuit board (PCB), according to one embodiment.

FIG. 6 illustrates another example collection of co-located radiating and conductive, physical elements, within an antenna volume, over a printed circuit board (PCB), according to one embodiment. Antenna volume 600 is similar to antenna volume 400 except that antenna volume 400 comprises a different example antenna. In particular, antenna 604 is a planar inverted "F" antenna (PIFA). It is however, appreciated that the functionality presented by the described embodiments are not limited to any particular antenna design. Various other types of antenna designs may be utilized and the antenna designs of FIGS. 4 and 6 are for illustration purposes. Antenna volume 600 also comprises headset jack 624, which further comprises ground pin 614.

With ongoing reference to FIGS. 2 and 3, controller 126 similarly configures tunable impedance 128 to a pre-determined level of impedance. In addition, controller 126 triggers switch 206 to connect tunable impedance 128 to ground pin 614, which is coupled to a ground signal line. This connection of tunable impedance 128 to ground pin 614 provides antenna tuning corresponding to the pre-determined level of impedance. In one embodiment, as illustrated within antenna volume 600, PIFA antenna 604 is coupled to a ground plane at one end of antenna 604 (e.g., at the left side of PIFA antenna 604). Antenna 604 is coupled to the ground plane at the left end of antenna 604 to enhance the radiation bandwidth characteristics of antenna 604. The corresponding frequency responses are illustrated in FIG. 7.

Figure 7:
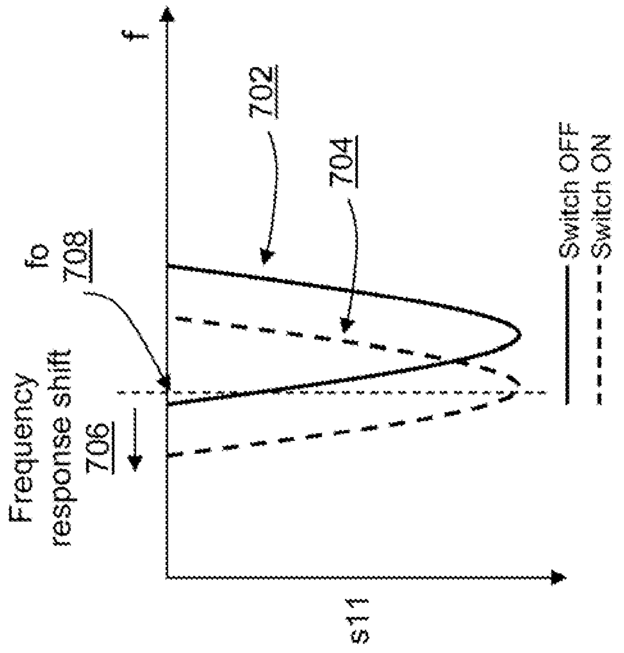
FIG. 7 illustrates frequency response plots for a planar inverted "F" antenna (PIFA), according to one embodiment.

FIG. 7 illustrates frequency response plots for signals at the PIFA antenna, according to one embodiment. Graph 700 comprises first plot 702 and second plot 704. First plot 702 shows the antenna frequency response when tunable impedance 128 is not connected to the ground signal line. Second plot 704 shows the antenna frequency response when tunable impedance 128 is connected to the ground signal line. A comparison of second plot 704 and first plot 702 demonstrates that a properly or an ideally configured and connected tunable impedance provides a substantial frequency response adjustment (i.e., frequency response shift 706) or correction for the antenna. As illustrated in graph 700, the particular implementation of the PIFA antenna 600 (of FIG. 6) provides a single resonant frequency, resonant frequency "fo" 708, unlike the dual arm antenna implementation of FIG. 4. The dual arm antenna implementation of FIG. 4 has two resonant frequencies corresponding to the left arm and right arm, respectively.

Figure 8:
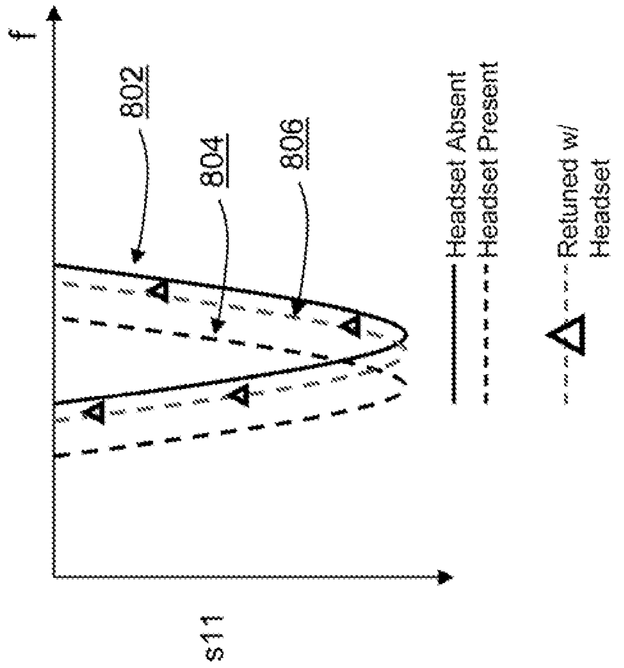
FIG. 8 illustrates additional frequency response plots for a PIFA antenna, according to one embodiment.

FIG. 8 illustrates other frequency response plots for signals at the PIFA antenna, according to one embodiment. Graph 800 comprises first plot 802, second plot 804 and third plot 806. First plot 802 shows the antenna frequency response when (a) the headset is not present and (b) tunable impedance 128 is not connected to the ground signal line. Second plot 804 shows the antenna frequency response when (a) the headset is present and (b) tunable impedance 128 is not connected to the ground signal line. Third plot 806 shows the antenna frequency response when (a) the headset is present and (b) tunable impedance 128 is connected to the ground signal line to provide antenna tuning. A comparison of third plot 806 and second plot 804 demonstrates that a properly or ideally configured and connected tunable impedance provides a substantial frequency response adjustment or correction for the antenna, especially when the headset is present.

Figure 9:
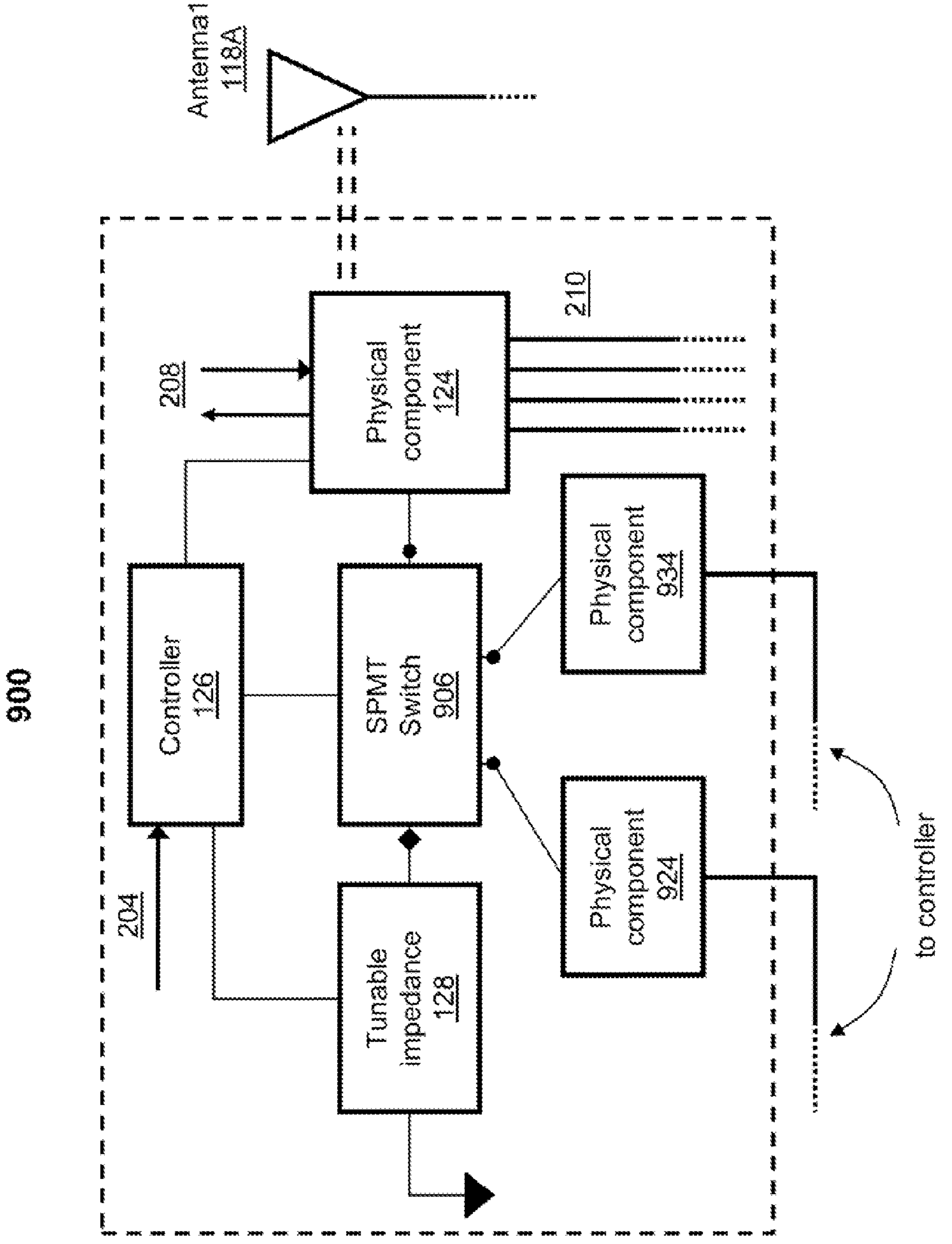
FIG. 9 illustrates another block diagram representation of impedance tuning circuit components (ITCC), in a wireless communications device (WCD), according to one embodiment.

FIG. 9 illustrates another block diagram representation of impedance tuning circuit components (ITCC) 900, in a wireless communications device (WCD), such as WCD 100 of FIG. 1, according to one embodiment. ITCC 900 includes several physical components including first physical component 124, second physical component 924 and third physical component 934. The various physical components are connected to DIT controller 126. In addition, DIT controller 126 is coupled to single pole multiple throw (SPMT) switch 906, which is also referred to herein as an SPMT device SPMT switch 906 is coupled to the various physical components at respective ports and to tunable impedance 128 via a separate port. SPMT switch 906 selectively connects tunable impedance 128 to a signal line associated with a particular physical component selected (via switch position) from among multiple physical components respectively associated with different operating states of the device. DIT controller 126 selectively connects a particular physical component to tunable impedance 128, via SPMT switch 906, in response to an activation of one or more functions of the particular physical component 124. Tunable impedance 128 performs impedance matching and/or antenna tuning to minimize capacitive loading effects on an antenna (e.g., antenna 118A) that is co-located with the particular physical component. In one or more embodiments, the capacitive loading effects are caused by one or more functions of the particular physical component being activated. Tunable impedance 128 provides antenna tuning to compensate for capacitive loading on antenna 118A caused by the particular physical component being utilized to support or enable a corresponding operating state.

In one multi-mode implementation, controller 126 receives information indicating that a plurality of operating states are currently active in the communications device. Several of these operating states are enabled or supported by activation of functions provided by various ones of the multiple physical components. For example, functions associated with physical component 924 and physical component 934 can be concurrently implemented and/or performed. The activation of functions in the various physical components can cause different levels of capacitive loading to impact the co-located antenna. The physical components can comprise at least one signal line, including, for example, a ground signal line. The capacitive loading impact on the co-located antenna originate from the at least one signal line and/or from contact springs coupled to respective signal lines. Controller 126 minimizes capacitive loading associated with a selected physical component by configuring a pre-established impedance level at the tunable impedance associated with a particular operating state and triggers SPMT switch 906 to connect the tunable impedance to a signal line of the selected physical component to provide a corresponding antenna tuning. The selected physical component is chosen from among a plurality of physical components that are connected by corresponding ground signal lines to respective ports of SPMT switch 906.

In order to select a particular physical component and a corresponding ground signal line to connect to tunable impedance 128 through SPMT switch 906, controller 126 evaluates a current set of operating states of the device and determines which one of the current set of operating states has a highest priority for impedance tuning. In particular, controller 126 retrieves information about pre-established operating states and corresponding relative priorities of these operating states from a data source, such as operating state and priorities data module 106 (FIG. 1). In one embodiment, these priorities are pre-established and stored within a table or other data structure that also includes, for each of multiple identified operating conditions or physical component(s) causing the operating condition, an identifier of the operating condition, the associated impedance to which the tunable impedance should be set when the device is in that operating condition, and the priority associated with that operating condition relative to the other operating conditions within the table or data structure. Controller 126 identifies the matches between the current set of operating states and the pre-established operating states. Controller 126 identifies, from the retrieved information, the corresponding priority level for current operating states that match pre-established operating states. The various operating states are respectively associated with pre-determined levels of configurable impedances and of impedance tuning Controller 126 selectively configures tunable impedance 128 to the specific preset impedance level associated with the identified one of the operating states having the highest priority. The operating state having the highest priority also corresponds to a particular physical component and a corresponding signal line connection to the SPMT switch 906. Controller 126 then triggers SPMT switch 906 to selectively connect tunable impedance 128 to the signal line of the particular physical component. Tunable impedance 128 provides antenna tuning associated with the identified one of the operating states having the highest priority.

Figure 10:
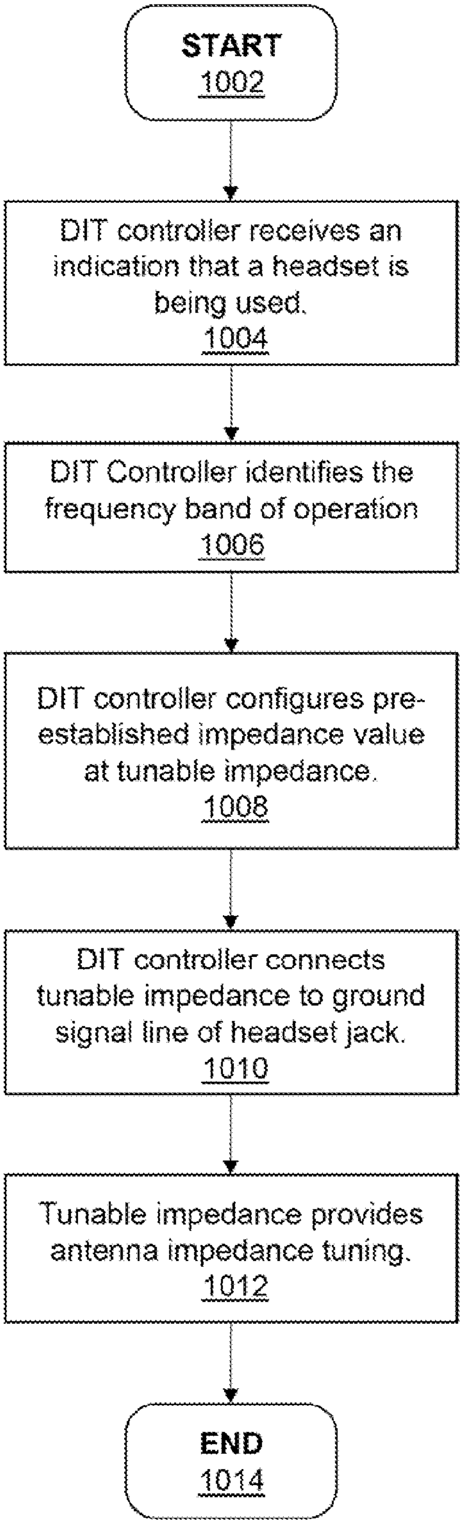
FIG. 10 is a flow chart illustrating the method for providing impedance tuning when a headset is connected to a headset jack, within a communications device, according to one embodiment.
Figure 11:
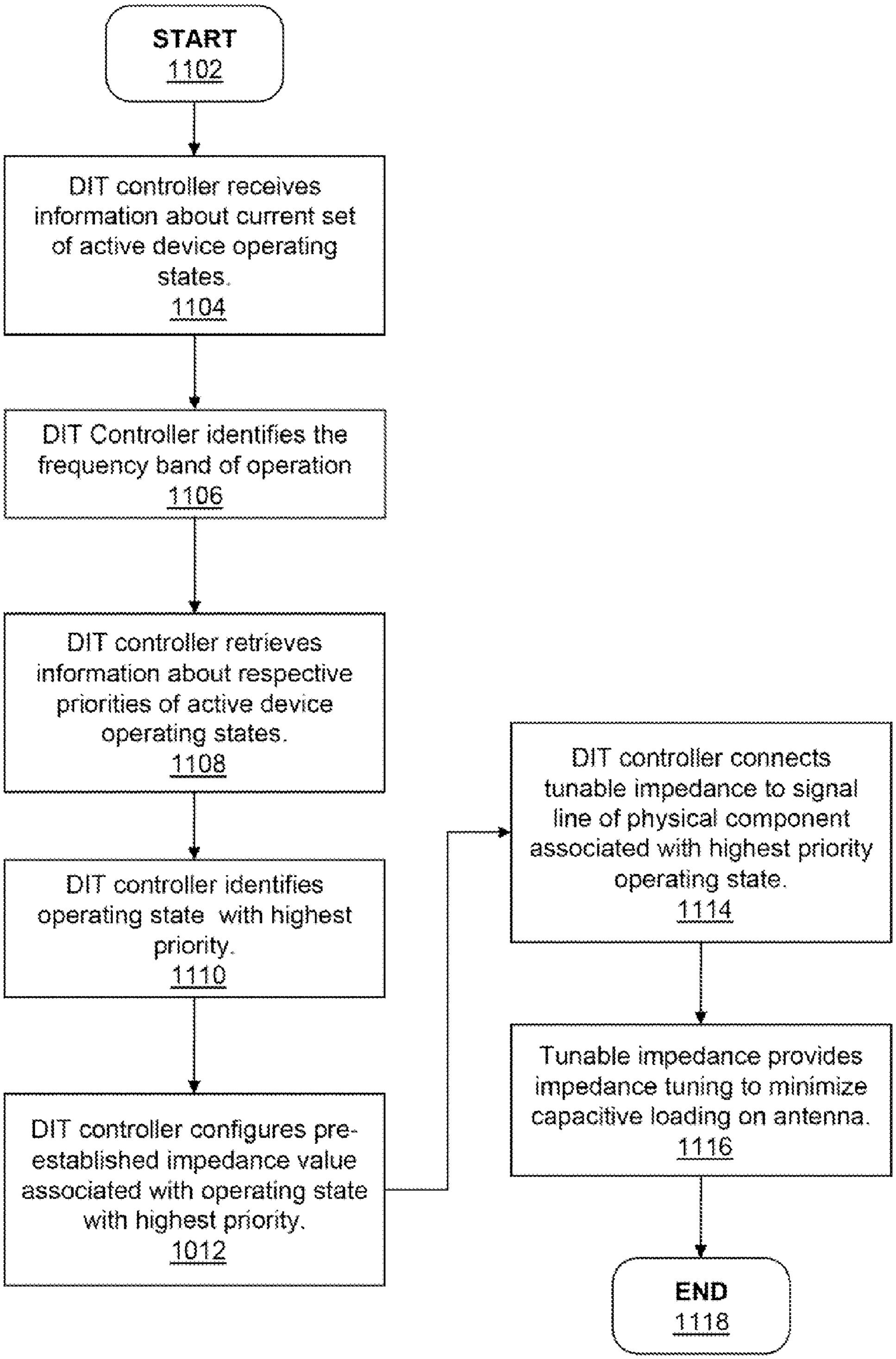
FIG. 11 is a flow chart illustrating the method for selectively providing impedance tuning to compensate for capacitive loading associated with a particular operating state, based on relative priorities of active operating states, according to one embodiment.

FIGS. 10 and 11 are flow charts illustrating two methods by which aspects of the above described processes of the illustrative embodiments can be completed. Although the methods illustrated in FIGS. 10 and 11 may be described with reference to components and functionality illustrated by and described in reference to FIGS. 1-9, it should be understood that this is merely for convenience and that alternative components and/or configurations thereof can be employed when implementing the various methods. Certain functions within the methods may be completed by DIT logic 108 executing on one or more processors, such as processor 110 or DSP 114 within WCD 100 (FIG. 1). Alternatively, the functions can be completed by controller 126. The executed processes then control specific operations of or on WCD 100. For simplicity in describing the methods, all method processes and/or functions are described from the perspective of controller 126.

FIG. 10 illustrates the method for providing impedance tuning when a headset is connected to a headset jack, within a communications device, according to one embodiment. The method begins at initiator block 1002 and proceeds to block 1004 at which DIT controller 126 receives an indication that a headset is inserted into the headset jack. At block 1006, controller 126 identifies the frequency of operation in order to determine how to properly configure tunable impedance 128. At block 1008, controller 126 configures a pre-established level of impedance at/on tunable impedance 128. Controller 126 configures the pre-established level of impedance at tunable impedance 128 to provide (a) an operating frequency adjustment and/or (b) antenna tuning to compensate for capacitive loading caused by headset jack elements and/or the presence of the headset. At block 1010, controller 126 triggers SPST switch 206 to connect tunable impedance 128, configured with the pre-established level of impedance, to the ground signal line of headset jack 124. At block 1012, tunable impedance provides antenna impedance tuning to (a) provide operating frequency adjustment or (b) minimize capacitive loading on the antenna caused by headset jack elements and/or the presence of the headset. The process ends at block 1014.

FIG. 11 illustrates the method for selectively providing impedance tuning to compensate for capacitive loading associated with a particular operating state, based on relative priorities of active operating states, according to one embodiment. The method begins at initiator block 1102 and proceeds to block 1104 at which DIT controller 126 receives information about a current set of active device operating states. In one embodiment, DIT controller 126 receives this information from operating state and priorities data module 106. At block 1106, controller 126 identifies the frequency of operation in order to determine how to properly configure tunable impedance 128. At block 1108, controller 126 retrieves information about respective priorities of the active device operating states. At block 1110, controller 126 identifies a current operating state with the highest priority. At block 1112, controller 126 configures tunable impedance 128 to a pre-established impedance value associated with the current operating state that has the highest priority. At block 1114, controller 220 triggers SPMT switch 906 to connect tunable impedance 128 to a ground signal line of the physical component associated with the highest priority operating state. At block 1116, tunable impedance provides antenna impedance tuning corresponding to the configured pre-established impedance value associated with the current operating state that has the highest priority. The process ends at block 1118.

The flowchart and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

In some implementations, certain processes of the methods are combined, performed simultaneously or in a different order, or perhaps omitted, without deviating from the spirit and scope of the invention. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A communications device comprising:

at least one antenna;

a physical component co-located in proximity to a first antenna of the at least one antenna, and which comprises one or more signal lines connected to printed circuit board (PCB) contacts that are extended from a PCB, wherein the physical component comprises (a) at least one of conductive element and a movable element from which capacitive loading effects on first antenna can originate, wherein the at least one conductive element and movable element is respectively associated with one signal line and (b) a connection between at least one of the signal line and a corresponding ground signal line of the physical component and a switch;

a tunable impedance switchably connected via the switch to the ground signal line, wherein the tunable impedance provides tuning of the first antenna to minimize capacitive loading experienced by said first antenna while a function of the physical component is activated, which function correlates to the device being in a particular operating state; and a controller coupled to the tunable impedance and which, in response to activation of the function of the physical component, configures the tunable impedance to a preset impedance level to compensate for said capacitive loading and triggers the switch to connect the tunable impedance to the ground signal line to provide antenna tuning corresponding to the preset impedance level.

2. The communications device of claim 1, wherein the controller:

detects whether an operating frequency of the communications device is being adjusted to an adjusted operating frequency;

in response to detecting that the operating frequency is being adjusted, configures the tunable impedance to a next pre-set impedance level that supports the adjusted operating frequency; and triggers the switch to connect the tunable impedance to at least one signal line of the physical component to tune the first antenna to a particular operating frequency corresponding to the adjusted operating frequency.

3. The communications device of claim 2, wherein the controller configures the tunable impedance to a pre-determined impedance level to enable the communications device to change an antenna operating frequency from a first operating frequency to a second operating frequency, in response to detecting that the communications device is adjusting the operating frequency between a first frequency band and a second frequency band.

4. The communications device of claim 1, wherein:

the switch is a single pole multiple throw (SPMT) device that connects a tunable impedance to one of a plurality of signal lines to selectively provide antenna tuning to compensate for capacitive loading respectively associated with a particular operating state of the device; and the controller evaluates a current set of operating states of the device, determines which one of the current set of operating states has a highest priority for impedance tuning, selectively configures the tunable impedance to a present impedance level associated with the identified one of the operating states having the highest priority, and triggers the SPMT device to selectively connect the tunable impedance to a corresponding signal line to provide antenna tuning that corresponds to the identified one of the operating states having the highest priority.

5. The communications device of claim 1, wherein the tunable impedance provides at least one of: (a) a pre-established level of antenna tuning to compensate for a pre-determined capacitive load; and (b) a dynamically determined level of antenna tuning to compensate for a variable capacitive load; and wherein said dynamically determined level of antenna tuning is provided by a variable tuner that connects directly to the ground signal line, instead of being switchably connected to the ground signal line.

6. The communications device of claim 1, wherein:

the physical component is at least one of: (a) a headset jack component; (b) a micro-USB (Universal Serial Bus) connector; and (c) a High Definition Multimedia Interface (HDMI) connector.

7. The communications device of claim 1, wherein:

the physical component is a speaker that includes at least one of a movable metallic element and a conductive element that exhibits movement and vibration while the speaker is being used in a particular operating state of the communication device; and the controller configures the tunable impedance to an impedance level to minimize capacitive loading associated with the movement and vibration of the conductive element.

8. An antenna system comprising:

at least one antenna;

a physical component co-located in proximity to a first antenna of the at least one antenna, and which comprises one or more signal lines connected to printed circuit board (PCB) contacts that are extended from a PCB, wherein the one or more signal lines can be isolated with passive devices, wherein the physical component comprises (a) at least one of conductive element and a movable element from which capacitive loading effects on first antenna can originate, wherein the at least one conductive element and movable element is respectively associated with one signal line and (b) a connection between at least one of the signal line and a corresponding ground signal line of the physical component and a switch;

a tunable impedance switchably connected via the switch to the ground signal line, wherein the tunable impedance provides tuning of the first antenna to minimize capacitive loading experienced by said first antenna while a function of the physical component are activated, which function correlates to the device being in a particular operating state; and a controller coupled to the tunable impedance and which, in response to activation of the function of the physical component, configures the tunable impedance to a preset impedance level to compensate for said capacitive loading and triggers the switch to connect the tunable impedance to the ground signal line to provide antenna tuning corresponding to the preset impedance level.

9. The antenna system of claim 8, wherein the controller:

detects whether an operating frequency of the communications device is being adjusted to an adjusted operating frequency;

in response to detecting that the operating frequency is being adjusted, configures the tunable impedance to a next pre-set impedance level that supports the adjusted operating frequency; and triggers the switch to connect the tunable impedance to at least one signal line of the physical component to tune the first antenna to a particular operating frequency corresponding to the adjusted operating frequency.

10. The antenna system of claim 9, wherein:

the controller configures the tunable impedance to a predetermined impedance level to enable the communications device to change an antenna operating frequency from a first operating frequency to a second operating frequency, in response to detecting that the communications device is adjusting the operating frequency between a first frequency band and a second frequency band.

11. The antenna system of claim 8, wherein:

the switch is a single pole multiple throw (SPMT) device that connects a tunable impedance to one of a plurality of signal lines to selectively provide antenna tuning to compensate for capacitive loading respectively associated with a particular operating state of the device; and the controller evaluates a current set of operating states of the device, determines which one of the current set of operating states has a highest priority for impedance tuning, selectively configures the tunable impedance to a present impedance level associated with the identified one of the operating states having the highest priority, and triggers the SPMT device to selectively connect the tunable impedance to a corresponding signal line to provide antenna tuning in support of the identified one of the operating states having the highest priority.

12. The antenna system of claim 8, wherein the tunable impedance provides at least one of: (a) a pre-established level of antenna tuning to compensate for a pre-determined capacitive load; and (b) a dynamically determined level of antenna tuning to compensate for a variable capacitive load;

wherein said dynamically determined level of antenna tuning is provided by a variable tuner that connects directly to the ground signal line, instead of being switchably connected to the ground signal line.

13. The antenna system of claim 8, wherein:

the physical component is at least one of: (a) a headset jack component; (b) a micro-USB (Universal Serial Bus) connector; and (c) a High Definition Multimedia Interface (HDMI) connector.

14. The antenna system of claim 8, wherein:

the physical component is a speaker that includes at least one of a movable metallic element and a conductive element that exhibits movement and vibration while the speaker is being used in a particular operating state of the communication device; and the controller configures the tunable impedance to an impedance level to minimize capacitive loading associated with the movement and vibration of the conductive element.

15. In an antenna system having at least one antenna, a physical component co-located in proximity to a first antenna of the at least one antenna, and which comprises signal lines connected to printed circuit board (PCB) contacts that are extended from a PCB, and a tunable impedance, and, wherein the physical component comprises (a) at least one of conductive element and a movable element from which capacitive loading effects on first antenna can originate, wherein the at least one conductive element and movable element is respectively associated with one signal line and (b) a connection between at least one of the signal line and a corresponding ground signal line of the physical component and a switch, a method comprising:

determining whether a particular operating state is currently active, wherein said particular operating state correlates with at least one function of the physical component being activated;

in response to determining that the particular operating state is currently active, configuring the tunable impedance to a pre-set impedance level to compensate for capacitive loading on a first antenna that is caused by the at least one function of the physical component being activated; and triggering a switch to connect the tunable impedance to the ground signal line to provide antenna tuning corresponding to the preset impedance level.

16. The method of claim 15, further comprising:

configuring the tunable impedance to a pre-determined impedance level to enable the communications device to adjust an antenna operating frequency from a first operating frequency to a second operating frequency, in response to detecting that the communications device is adjusting the operating frequency between a first frequency band and a second frequency band.

17. The method of claim 15, further comprising:

connecting a tunable impedance to one of a plurality of signal lines to selectively provide antenna tuning to compensate for capacitive loading respectively associated with a particular operating state of the device.

18. The method of claim 17, further comprising:

evaluating a current set of operating states of the device;

determining which one of the current set of operating states has a highest priority for impedance tuning;

configuring, to a preset level of impedance, a tunable impedance associated with the identified one of the operating states having the highest priority; and selectively connecting the tunable impedance to a corresponding signal line to provide antenna tuning that corresponds to the preset level of impedance, wherein said antenna tuning supports the identified one of the operating states having the highest priority.

19. The method of claim 15, wherein:

the physical component is at least one of: (a) a headset jack component; (b) a micro-USB (Universal Serial Bus) connector; and (c) a High Definition Multimedia Interface (HDMI) connector.

20. The method of claim 15, wherein:

the physical component is a speaker that includes at least one of a movable metallic element and a conductive element that exhibits movement and vibration while the speaker is being used in a particular operating state of the communication device; and the controller configures the tunable impedance to an impedance level to minimize capacitive loading associated with the movement and vibration of the conductive element.

* * * * *